United States Patent [19]
Kamada et al.

[11] Patent Number: 6,117,474
[45] Date of Patent: Sep. 12, 2000

[54] AQUEOUS SUSPENSION COMPOSITION AND WATER-DISPERSIBLE DRY COMPOSITION AND METHOD OF MAKING

[75] Inventors: Etsuo Kamada; Nobuyoshi Mochihara, both of Miyazaki, Japan

[73] Assignee: Asahi Kasei Kogyo Kabushiki Kaisha, Osaka, Japan

[21] Appl. No.: 09/331,664

[22] PCT Filed: Dec. 22, 1997

[86] PCT No.: PCT/JP97/04752

§ 371 Date: Jun. 23, 1999

§ 102(e) Date: Jun. 23, 1999

[87] PCT Pub. No.: WO98/28362

PCT Pub. Date: Jul. 2, 1998

[30] Foreign Application Priority Data

Dec. 24, 1996 [JP] Japan .................................. 8-355423
Jul. 25, 1997 [JP] Japan .................................. 9-200437

[51] Int. Cl.$^7$ ................... A23L 1/0534; A23L 1/304; A23L 2/00
[52] U.S. Cl. .................... 426/590; 426/74; 426/518; 426/573; 424/156
[58] Field of Search ................ 426/74, 518, 573, 426/590; 424/156

[56] References Cited

U.S. PATENT DOCUMENTS

4,744,987   5/1988   Mehra et al. ...................... 424/156

FOREIGN PATENT DOCUMENTS

| | | |
|---|---|---|
| 63-29973 | 9/1981 | Japan . |
| 57-35945 | 2/1982 | Japan . |
| 61-207343 | 9/1986 | Japan . |
| B26329973 | 6/1988 | Japan . |
| 231942 | 7/1988 | Japan . |
| 3-252430 | 11/1991 | Japan . |
| 8107772 | 4/1996 | Japan . |
| 8205820 | 8/1996 | Japan . |

*Primary Examiner*—Helen Pratt
*Attorney, Agent, or Firm*—Birch, Stewart, Kolasch & Birch, LLP

[57] ABSTRACT

An aqueous suspension composition containing at least 2 wt. % of a fine cellulose and a water-insoluble calcium material which have been subjected to a wet co-grinding treatment, having a weight ratio of the fine cellulose to the water-insoluble calcium material of from 1/9 to 9/1 and having a proportion of particles having a particle size of at least 10 $\mu$m of not greater than 40%; a preparation process therefor; and a water-dispersible dry composition and a food composition using the same.

14 Claims, No Drawings

AQUEOUS SUSPENSION COMPOSITION AND WATER-DISPERSIBLE DRY COMPOSITION AND METHOD OF MAKING

This application is the national phase under 35 U.S.C. § 371 of Pct International Application No. PCT/JP97/04752 which has an International filing date of Dec. 22, 1997, which designated the United States of America.

TECHNICAL FIELD

The present invention relates to an aqueous suspension composition comprising a fine cellulose and a water-insoluble calcium, which composition is added to foods or the like to reinforce calcium or impart cloudiness, or added to coating materials or the like as a filler. The present invention also relates to a process for preparing the aqueous suspension composition. The present invention further relates to a water-dispersible dry composition which permits re-dispersion of the fine cellulose and water-insoluble calcium by stirring in water.

Furthermore, the present invention relates to a food composition comprising the aqueous suspension composition or water-dispersible dry composition.

BACKGROUND ART

Some attempts have so far been made to stably suspend water-insoluble calcium in water. Examples include a process which comprises treating calcium carbonate with a hydrophilic emulsifier (JP-B-2-31942 (the term "JP-B" as used herein means an "examined published Japanese patent publication")), a process which comprises stirring a slightly water soluble calcium salt together with an oxy acid, thereby obtaining the calcium salt having an average particle size of 1 $\mu$m, and then adding a hydrophilic emulsifier to the resulting mixture (JP-A-8-107772 (the term "JP-A" as used herein means an "unexamined published Japanese patent application")), and a process which comprises treating a mixture of calcium carbonate and an emulsifier in a high-pressure homogenizer, thereby finely dispersing the mixture (JP-A-8-205820).

When the water-insoluble calcium salt is finely dispersed by any one of the above-exemplified processes, the sedimentation velocity becomes slow, but it sediments after allowed to stand for a certain time and forms a hard cake. Therefore, it is difficult to obtain a suspended state again.

JP-B-57-35945 and JP-B-63-29973 disclose a beverage which becomes free from the sedimentation of calcium due to the addition of crystalline cellulose. However, these techniques are accompanied by problems. For example, since the conventionally employed crystalline cellulose has a large particle size and the crystalline cellulose and calcium are not subjected to a co-grinding treatment, the effects of preventing sedimentation are not sufficient. In addition, a coarse texture is felt upon drinking the beverage.

An object of the present invention is to provide an aqueous suspension composition which is free from the sedimentation of the water-insoluble calcium material contained in the composition and which exhibits a stable dispersion state when added to foods, including a beverage, for the reinforcement of calcium or when added to coatings or the like as a filler. Another object of the present invention is to provide a preparation process for the aqueous suspension composition. Another object of the present invention is to provide a water-dispersible dry composition which permits re-dispersion of the water-insoluble calcium material and which exhibits a stable dispersion state without sedimentation by stirring in water.

Still another object of the present invention is to provide a food composition which has a water-insoluble calcium material stably dispersed therein by incorporating the aqueous suspension composition or the water-dispersible dry composition.

DISCLOSURE OF THE INVENTION

The present inventors have found that the above-described problem can he solved by forming a composite of a water-insoluble calcium material and a fine cellulose, leading to the completion of the present invention.

The present invention therefore provides:

1) An aqueous suspension composition containing at least 20 wt. % of a fine cellulose and a water-insoluble calcium material which have been subjected to a wet co-grinding treatment, having a weight ratio of the fine cellulose to the water-insoluble calcium material of from 1/9 to 9/1, and wherein not greater than 40% of the particles have a particle size of at least 10 $\mu$m.

2) The aqueous suspension composition according to the above 1), wherein the fine cellulose and the water-insoluble calcium material have an average particle size not greater than 8 $\mu$m.

3) A process for the preparation of an aqueous suspension composition, which comprises: suspending a low-polymerization-degree cellulose and a water-insoluble calcium in water to provide a suspension having a weight ratio of the low-polymerization-degree cellulose to the water-insoluble calcium of from 1/9 to 9/1 and a content of the low-polymerization-degree cellulose and water-insoluble calcium of at least 2 wt %; and then subjecting the suspension to a wet co-grinding treatment to adjust the average particle size of the fine cellulose and water-insoluble calcium material to not greater than 8 $\mu$m and to adjust the proportion of particles having a particle size of at least 10 $\mu$m to not greater than 40%.

4) A water-dispersible dry composition, which comprises: from 30 to 98 wt. % of a fine cellulose and a water-insoluble calcium material which have been subjected to a wet co-grinding treatment; and from 2 to 70 wt. % of a water soluble gum and/or a hydrophilic substance, wherein the weight ratio of the fine cellulose to the water-insoluble calcium material is from 1/9 to 9/1 and, wherein when the dry composition is re-dispersed in water by stirring, the proportion of the fine cellulose and water-insoluble calcium material particles having a particle size of at least 10 $\mu$m is not greater than 40%.

5) The water-dispersible dry composition according to the above 4), wherein the fine cellulose and the water-insoluble calcium material have an average particle size not greater than 8 $\mu$m when the dry composition is re-dispersed in water by stirring.

6) A food composition containing the aqueous suspension composition according to the above 1) or 2) or containing the water-dispersible dry composition according to the above 4) or 5).

BEST MODE FOR CARRYING OUT THE INVENTION

The fine cellulose contained in the aqueous suspension composition of the present invention can be obtained by subjecting a cellulose material, for example, wood pulp, purified linter, purified cellulose or plant fibers derived from a grain or fruits to depolymerization treatment such as acid hydrolysis, alkali oxidation decomposition, enzyme decomposition or steam explosion decomposition, or a combination thereof to provide a low-polymerization-degree cellulose having an average polymerization degree of from 30 to 375, purifying the resulting cellulose by washing, and then wet grinding the cellulose together with a water-insoluble calcium material while applying thereto a mechanical shear. In the present invention, such an operation of simultaneously grinding a cellulose material and water-soluble calcium material in the presence of water is called a wet co-grinding treatment. At that time, a fine cellulose and water-insoluble calcium material are subjected to wet co-grinding so that their average particle size does not exceed 8 μm and the proportion of particles having a particle size of at least 10 μm does not exceed 40% in the particle size distribution.

An aqueous suspension of the fine cellulose and water-insoluble calcium material obtained by wet co-grinding of the low polymerization degree cellulose and water-insoluble calcium material can effectively prevent the sedimentation of the water-insoluble calcium material by forming a network structure of the fine cellulose in water and, in addition, the coarse texture felt on the tongue is eliminated. As is described below, the water-insoluble calcium associates with the fine cellulose, which is presumed to prevent separation and sedimentation of the water-insoluble calcium alone from the network structure of the fine cellulose. Even if sedimentation occurs, it does not form a tough sediment for the same reason. The water-insoluble calcium material is therefore easily dispersed by shaking the suspension lightly. Compared with the conventional mixture of a crystalline cellulose and a calcium material, the aqueous suspension composition of the present invention brings about markedly good effects in terms of suspension stability and texture.

The water-insoluble calcium material contained in the aqueous suspension composition of the present invention is a calcium compound which is either insoluble or sparingly soluble in water. Examples include calcium carbonate, tricalcium phosphate, calcium monohydrogenphosphate, calcium dihydrogenphosphate, calcium sulfate, calcium citrate and calcium lactate. They also include natural calcium materials and processed goods thereof, for example, uncalcined calcium such as bones of animals and fishes, shells, egg shells and coral, calcined calcium and whey calcium. For effective supply of calcium, the calcium content of the water-insoluble calcium material is preferably at least 10 wt. %.

In the aqueous suspension composition, it is possible to incorporate components other than the fine cellulose and water-insoluble calcium material, such as saccharide, thickeners, emulsifiers, acidulants, salt, coloring matter, sweeteners, fats and oils, and preservative as needed freely.

The aqueous suspension composition according to the present invention contains a fine cellulose and a water-insoluble calcium material in an amount of at least 2 wt. %. Amounts less than 2 wt. % lead to an excessively small calcium content, which lowers the commodity value and is not economical from the viewpoint of shipping. The content is preferably not less than 5 wt. %. In addition, the content is preferably not greater than 50 wt. %. Amounts exceeding 50 wt. % increase the viscosity of the aqueous suspension composition, which leads to a difficulty in handling. The content is particularly preferably not greater than 40 wt. %.

The weight ratio of the fine cellulose to the water-insoluble calcium material falls within a range of from 1/9 to 9/1. When the ratio is less than 1/9, the amount of the fine cellulose is so small that sedimentation of the water-insoluble calcium material cannot be prevented sufficiently. When the ratio exceeds 9/1, on the other hand, the calcium content becomes too small, which lowers the commodity value. The weight ratio is preferably within a range of from 2/8 to 8/2.

In the aqueous suspension composition of the present invention, the proportion of particles of the fine cellulose and water-insoluble calcium material having a particle size of at least 10 μm is not greater than 40% and the average particle size is preferably not greater than 8 μm. It is more preferred that the average particle size is not greater than 6 μm and the proportion of the particles having a particle size of at least 10 μm is 30% or less. It is still more preferred that the average particle size is not greater than 4 μm and the proportion of the particles having a particle size of at least 10 μm is 10% or less. It is particularly preferred that the average particle size is not greater than 3 μm and the proportion of the particles having a particle size of at least 10 μm is 5% or less.

When the proportion of the particles having a particle size of at least 10 μm exceeds 40%, the water-insoluble calcium material having a higher specific gravity starts sedimenting faster than the fine cellulose and, in addition, a coarse texture is felt on the tongue upon eating or drinking. The smaller the particle size, the more the coarse texture feeling is suppressed. The particle size cannot however be lowered without limitation and it depends on the pulverization technique or apparatus. The lower limit of the average particle size is presumed to be about 0.05 μm at present.

In the present invention, preferred examples of a wet grinder include, when the raw material before grinding is in the form of a slurry or paste, medium agitating mills such as a wet vibration mill, a wet planetary vibration mill, a wet ball mill, a wet roll mill, a wet coball mill, a wet bead mill and a wet paint shaker and a high-pressure homogenizer.

In a wet bead mill, for example, grinding is effected by filling spherical beads, such as zirconia or alumina, having a particle size of about 0.5 to 2 mm in 50 to 90% of a container and then allowing the raw materials to pass through the beads while stirring the beads at a high velocity by a stirrer. It is effective to use a high-pressure homogenizer which introduces the slurry into a fine orifice under a high pressure of about 500 $kg/cm^2$ and causes collision at a high flow rate.

For the purpose of the present invention, the above-described grinders may be used either singly or in combination. A proper grinder may be selected as needed depending on the level of fine division necessary for the application, requirement of viscosity or the like. For the effective fine division, a medium stirring mill is suitable, while a high-pressure homogenizer is excellent for giving a smooth texture feeling on the tongue.

The raw material in the form of a cake may be subjected to kneading and grinding by a planetary mixer, kneader, a mixing-grinding machine or extruder, followed by the addition of water as needed in order to impart fluidity.

On the aqueous suspension composition stored for a long period of time, microorganisms may presumably proliferate so that addition of a preservative, retorting or sterilizing operation such as continuous sterilization can be conducted as needed.

The water-dispersible dry composition according to the present invention comprises from 30 to 98 wt. % of a fine cellulose and a water-insoluble calcium material, which has a proportion of particles thereof having a particle size of at least 10 μm of not greater than 40%; and from 2 to 70 wt.

% of a water soluble gum and/or a hydrophilic substance, wherein the weight ratio of the fine cellulose to the water-insoluble calcium material is from 1/9 to 9/1.

The water-soluble gum and/or hydrophilic substance are incorporated in order to prevent re-aggregation of the fine cellulose and water-insoluble calcium material upon drying. The water-dispersible dry composition according to the present invention is therefore easily returned to its initial state by stirring in water. Specifically, the fine cellulose and water-insoluble calcium material can be re-dispersed in water and the proportion of the fine cellulose and water-insoluble calcium material having a particle size of at least 10 μm becomes not greater than 40% and the water-insoluble calcium material is dispersed stably without causing sedimentation. The average particle size of the fine cellulose and water-insoluble calcium material is preferably 8 μm or less. It is more preferred that the average particle size is 6 μm or less and the proportion of the particles having a particle size of at least 10 μm is 30% or less. It is still more preferred that the average particle size is 4 μm or less and the proportion of the particles having a particle size of 10 μm or greater is 10% or less. It is particularly preferred that the average particle size is 3 μm or less and the proportion of the particles having a particle size of 10 μm or greater is 5% or less. Therefore, when the water-dispersible dry composition of the present invention is dispersed in water, the resulting dispersion exhibits improved suspension stability and reduces the coarse texture felt on the tongue.

By mixing the fine cellulose and water-insoluble calcium material, which have been ground together, with the water soluble gum and/or hydrophilic substance in the presence of water and then drying the resulting mixture, the resulting water-dispersible dry composition acquires good suspension stability of the water-insoluble calcium material and a good texture, as compared to that observed in the materials dried separately. Such an effect can be brought about for the following reason. When the fine cellulose and water-insoluble calcium material, which have been subjected to wet grinding treatment, are dispersed in water, they associate with each other. But when they are dispersed in water after mixing in the powdery form without wet grinding treatment, their particles are dispersed uniformly in water. Such a state can be found, for example, by dispersing a sample in water in a concentration of 1% (dispersed at 15000 rpm for 5 minutes by "Ace Homogenizer" manufactured by Nippon Seiki Co., Ltd.) and then observing the dispersion through a light microscope.

Weight ratios of the fine cellulose to the water-insoluble calcium material less than 1/9 cannot sufficiently prevent sedimentation of the water-insoluble calcium material due to a too small content of the fine cellulose.

When the weight ratio exceeds 9/1, the calcium content becomes excessively low, thereby lowering the commodity value. The weight ratio is preferably within a range of 2/8 to 8/2.

If the total amount of the water soluble gum and/or hydrophilic substance is less than 2 wt. %, re-aggregation during the drying step is not sufficiently prevented. Total amounts of the water soluble gum and/or hydrophilic substance exceeding 70 wt. %, on the other hand, decrease the content of the water-insoluble calcium material, leading to a decrease in the commodity value. It is preferred to formulate the composition such that the fine cellulose and water-insoluble calcium material are in an amount of 50 to 98 wt. % and water-soluble gum and/or hydrophilic substance are in an amount of 2 to 50 wt. %. It is particularly preferred to formulate the composition such that the fine cellulose and water-insoluble calcium material are in an amount of 60 to 95 wt. % and water-soluble gum and/or hydrophilic substance are in an amount of 5 to 40 wt. %.

The term "water soluble gum" means a water soluble gum which has a high water swelling property and good compatibility with cellulose in water. Examples thereof include locust bean gum, guar gum, casein and casein sodium, tamarind seed gum, quince seed gum, karaya gum, chitin, chitosan, gum arabic, tragacanth gum, gum ghatti, arabinogalactan, agar, carrageenan, alginic acid and salts thereof, propylene glycol alginate, furcellaran, pectin, quince, tara gum, almond gum, Aeromonas gum, Azotobacter Vinelandii gum, flax seed gum, welan gum, psyllium seed gum, xanthan gum, kardran, pullulan, dextran, geran gum, gelatin and cellulose derivatives such as carboxymethylcellulose sodium, of which carboxymethylcellulose sodium, xanthan gum, carrageenan, pectin, karaya gum, gelatin and gum arabic are preferred. These water soluble gums may be used in combination.

The term "hydrophilic substance" means an organic substance which has a high solubility in cold water and hardly increases the viscosity of the dispersion system. Examples thereof include saccharides such as starch hydrolyzate, dextrin, dextrose, fructose, xylose, sorbose, trehalose, sucrose, lactose, maltose, isomerized sugar, coupling sugar, palathinose, neosugar, reduced starch saccharified wheat gluten, lactulose, polydextrose and fructoligosuccharide and galactoligosaccharide, water-soluble succharides including oligosaccharides, and sugar alcohols such as xylitol, mannitol, multitol and sorbitol. Among them, starch hydrolyzate, dextrin, dextrose, fruit sugar, sucrose, lactose, maltose, polydextrose, mannitol and sorbitol are suited. These hydrophilic substances may be used in combination.

To the water-dispersible dry composition, components other than the fine cellulose, water-insoluble calcium material, water soluble gum and/or hydrophilic substance may be added as needed. Examples of such a component include, for example, an emulsifier, an acidulant, coloring matter, sweeteners, salt, fragrance, protein and/or oil and fat.

The water-dispersible dry composition of the present invention can be obtained by mixing a suspension of a fine cellulose and water-insoluble calcium material having particles of at least 10 μm in a particle size in an amount of not greater than 40% (weight ratio of the fine cellulose to the water-insoluble calcium material: 1/9 to 9/1) with a water-soluble gum and/or hydrophilic substance and then drying the resulting mixture.

The process for use in the invention also includes a process comprising premixing a low polymerization degree cellulose having an average polymerization degree of 30 to 375 and a water-insoluble calcium material with a water soluble gum and/or hydrophilic substance to obtain a premixture in the form of a slurry or a paste, grinding the resulting slurry or paste in a medium agitating mill, high-pressure homogenizer or the like to adjust the proportion of the particles of the fine cellulose and water-insoluble calcium material having a particle size of at least 10 μm to not greater than 40% and then drying. The process further embraces a process comprising kneading and grinding, in the form of a cake, the low-polymerization degree cellulose and water-insoluble calcium material with the water soluble gum and/or hydrophilic substance in a planetary mixer, kneader, mixing-grinding machine, extruder or the like to adjust the proportion of the particles of the fine cellulose and water-insoluble calcium material having a particle size of at least 10 μm to not greater than 40% and then drying, and pulverizing as needed.

Regarding the drying method, the most suitable method must be selected depending on the water content and the state of the mixture to be dried. When the mixture is in the form of a slurry or paste, spray drying, lyophilization, drum drying, belt drying, thin-film drying or the like method can be employed. When the mixture is in the form of a cake, on the other hand, hot air drying, fluidized-bed drying, tray type drying, lyophilization or the like method can be employed. Even if the mixture is in the form of a cake, it may be changed to a slurry or paste by the addition of water and then dried by spray drying or the like method.

The upper limit of the water content after drying is preferably 15 wt. % or less in consideration of the handling properties and time-dependent stability, with 10 wt. % or less being particularly preferred and 5 wt. % or less being more preferred.

It should be noted that the dry product is obtained in the form of a laminate when dried by drum drying, belt drying, thin-film drying, fluidized-bed drying or the like so that it is preferred to pulverize the laminate by proper means such as impact pulverizer, jet mill pulverizer or the like into a powder fine enough to allow them to almost completely pass through a sieve having an opening of 425 μm.

The food composition according to the present invention comprises the aqueous suspension composition or water-dispersible dry composition with a view to reinforcing calcium, imparting cloudiness or the like to the foods.

Specific examples of the food composition include milk beverages such as milk, milk cocoa, milk coffee and soybean milk, table luxuries such as lactobacillus drink, cocoa drink, powdered green tea drink and azuki bean soup, ice cakes such as ice cream, soft ice cream and sherbet, gelatinous foods such as pudding, jelly, jam and soft azuki-bean jelly, milk shakes, coffee whitener, whipping cream, mayonnaise, dressings, spreads, seasoning soy, soup, mustard paste, flour paste, cooked food in a can, spreads, intubation liquid diet, mustard spread, filling and topping for breads or cakes, cakes with bean jam, fondant, fish paste, breads, cakes, Japanese-style cakes, noodles, pasta, frozen dough, powdered fat, powdered fragrance, powdered soup, powdered spice, cream powder and pickles.

As well as reinforcing calcium or imparting cloudiness, the aqueous suspension composition or water-dispersible dry composition according to the present invention can impart the food composition with a function derived from the fine cellulose or water soluble gum. Such functions include a suspension stabilizer, emulsion stabilizer, foam stabilizer, tissue imparting agent, fluidity improver, foam retainer, water separation preventive, dough improver, food fiber base or calorie reducing base such as substitute for oil and fat.

The food composition may be prepared by dispersing, in water, the aqueous suspension composition or water-dispersible dry composition simultaneously with main raw materials and other components such as coloring matter, spice, acidulant or thickener in a conventional manner. It is also possible to disperse the aqueous suspension composition or water-dispersible dry composition in water in advance, followed by addition.

Re-dispersion in water can be carried out by a dispersing, emulsifying or milling machine ordinarily employed in the preparation of food or the like. Examples include various mixers such as propeller mixer, high-speed mixer, homo-mixer and cutter, mills such as ball mill, colloid mill, bead mill and automated mortar machine, dispersing and emulsifying machines typified by high-pressure homogenizer, micro fluidizer and nanomizer and kneaders such as planetary mixer, kneader, extruder and turbulizer. These machines may be used in combination.

Calcium-reinforced milk can be prepared, for example, by mixing milk with the aqueous suspension composition or water-dispersible dry composition and dispersing and homogenizing the resulting mixture in a high-pressure homogenizer, or sufficiently dispersing the aqueous suspension composition or water-dispersible dry composition in water by using a homomixer and then mixing the resulting dispersion with milk. This process makes it possible to stably disperse the fine cellulose and water soluble calcium material without causing aggregation and to prevent sedimentation. In addition, a coarse texture is not felt on the tongue when the resulting milk is taken, because the fine cellulose and water-insoluble calcium material have been finely milled in it.

In a conventional manner wherein a crystalline cellulose and calcium are added separately without premixing, the crystalline cellulose and calcium have been subjected to neither a co-grinding treatment nor a drying and compounding treatment, and therefore their average particle size is large, sedimentation cannot be prevented sufficiently and a coarse texture is felt when taken.

The amount of the aqueous suspension composition or water-dispersible dry composition to be added to a food composition varies depending on the kind of food so that the optimum amount of each of them must be selected. In general, the aqueous suspension composition or water-dispersible dry composition is preferably added in an amount of about 0.01 to 15 wt. % in a solid content based on the whole food composition.

For beverages, addition in an amount of about 0.02 to 3 wt. % is preferred, with about 0.1 to 1.5 wt. % being particularly preferred. For foods in the pasty or creamy form such as mayonnaise, ice cream or whipping cream, addition of about 0.05 to 5 wt. % is preferred, with about 0.1 to 3 wt. % being particularly preferred. For foods in the semi-solid or solid form such as breads, biscuits or noodles, addition of about 0.3 to 12 wt. % is preferred, with about 0.5 to 7 wt. % being particularly preferred.

The present invention will be described in greter detail with reference to the following Examples.

Measurement was carried out as follows:

Measurement of particles having an average particle size of 10 μm or greater (1) A sample (3.0 g in terms of a solid content) is charged in an Ace Homogenizer ("AM-T", trade name; product of Nippon Seiki Co., Ltd.), which contains distilled water, to adjust the whole amount to 300 g.

(2) The sample is dispersed for 5 minutes at 15000 rpm.

(3) The particle size distribution is measured by a laser diffraction type particle size distribution measuring apparatus ("LA-910", trade name; manufactured by Horiba Ltd.) The average particle size is the particle size of 50% of an integrated volume and the proportion of the particles having a particle size of 10 μm or greater is indicated by a percentage (%) in the volume distribution.

Evaluation on the texture

The texture of each of the foods obtained in the examples and the comparative examples was tested as follows. Fifteen young females (19 years old on average) having no smoking habits were selected. The foods prepared respectively were tasted in each independent panel by the random test method.

Panelists were asked whether they had a "coarse feel" or not and the answers were collected. It should be noted that the feeling of a foreign matter remaining on the tongue was evaluated by a "coarse feel". Based on the results, the texture was evaluated by three ranks.

EXAMPLE 1

Commercially available DP pulp (dissolving pulp) cut into pieces were hydrolyzed in 7% hydrochloric acid at 105° C. for 20 minutes. The resulting acid insoluble residue was collected by filtration and washed, thereby a cellulose cake having a solid content of 40% was prepared. The resulting cellulose cake had an average particle size of 25 μm and an average polymerization degree of 160.

A dispersion was prepared using the resulting cellulose and calcium carbonate (product of Wako Pure Chemical Industries, Ltd.; average particle size: 8.5 μm, a proportion of the particles having a particle size of of at least 10 μm: 43%) at a solid content weight ratio and concentration as shown in Table 1. The cellulose dispersion was pulverized by allowing it to pass twice through a medium-stirring wet type pulverizer ("Apex Mill Type AM-1", trade name; product of Kotobuki Eng. & Mfg. Co., Ltd.) using zirconia beads of 1 mm-diameter as a medium and under the conditions of a stirring element rotational number of 1800 rpm and a feeding rate of the cellulose dispersion of 0.4 liter/min, thereby each of aqueous suspension compositions A to D was obtained.

The average particle size and proportion of the fraction having an average particle size of 10 μm or greater are shown in Table 1. Table 1 also includes the observation results of the sedimentation state of each composition after diluted to 1% concentration and allowed to stand for one day.

should be noted that the pulverization frequency was as described in Table 2.

The average particle size and fraction of the particles having a particle size of at least 10 μm are shown in Table 2. Table 2 also includes the observation results of the state of the sedimentation of each composition after diluted to 1% concentration and allowed to stand for 1 day.

EXAMPLE 3

In the same manner as in Example 1, a cellulose cake having a solid content of 40% was prepared.

Each of the dispersions were prepared using the resulting cellulose and dihydrogencalcium phosphate (product of Kishida Chemical Co., Ltd.; average particle size: 9.6 μm, proportion of particles having a particle size of at least 10 μm: 48%) at a solid content weight ratio and concentration as shown in Table 2. Then, the resulting dispersion was treated three times under pressures of 8000 and 1200 kg/cm2, respectively, by using an ultra-high-pressure homogenizer ("Microfluidizer M-610", trade name; manufactured by Microfluidics International Corporation), thereby each of aqueous suspension compositions H to I were obtained.

The average particle size and the proportion of fractions having a particle size of at least 10 μm are shown in Table 2. Table 2 also includes the observation results of the state of the sedimentation of each composition after diluted to 1% concentration and then allowed to stand for 1 day.

TABLE 1

| Aqueous suspension composition | Composition | | | | | State of |
|---|---|---|---|---|---|---|
| | Solid content weight ratio | | | Average | Proportion of at | sedimentation after allowed |
| composition | Fine cellulose | calcium material | Concentration (%) | particle size (μm) | least 10-μm particles (%) | to stand for 1 day |
| Ex. 1 | | | | | | |
| A | 8 | 2 | 5 | 2.8 | 2.1 | No sedimentation |
| B | 6 | 4 | 15 | 2.1 | 1.1 | No sedimentation |
| C | 4 | 6 | 20 | 2.2 | 1.5 | No sedimentation |
| D | 2 | 8 | 30 | 1.5 | 0.1 | No sedimentation |

EXAMPLE 2

In the same manner as in Example 1, a cellulose cake having a solid content of 40% was prepared.

Each of the dispersions were prepared using the resulting cellulose and calcium carbonate (product of Wako Pure Chemical Industries, Ltd.) used in Example 1 at a solid content weight ratio and a concentration as shown in Table 2, followed by pulverization in a medium-stirring wet pulverizer under similar conditions to Example 1, thereby each of aqueous suspension compositions E to G was obtained. It

TABLE 2

| | Composition | | | | Physical properties of aqueous suspension composition | | |
|---|---|---|---|---|---|---|---|
| Aqueous suspension | Solid content weight ratio | | Concentration (%) | Pulverization Frequency | Average particle size (μm) | Proportion of at least 10-μm particles (%) | State of precipitation after allowed to stand for 1 day |
| composition | Fine cellulose | Calcium material | | | | | |
| Ex. 1 | | | | | | | |
| E | 6 | 4 | 15 | 1 | 5.5 | 25 | No sedimentation |
| F | 6 | 4 | 15 | 3 | 1.1 | 0 | No sedimentation |

TABLE 2-continued

| Aqueous suspension composition | Composition | | | Pulverization Frequency | Physical properties of aqueous suspension composition | | State of precipitation after allowed to stand for 1 day |
|---|---|---|---|---|---|---|---|
| | Solid content weight ratio | | Concentration (%) | | Average particle size (μm) | Proportion of at least 10-μm particles (%) | |
| | Fine cellulose | Calcium material | | | | | |
| G | 6 | 4 | 15 | 5 | 0.3 | 0 | No sedimentation |
| Ex. 2 | | | | | | | |
| H | 4 | 6 | 20 | 3 | 4.8 | 14 | No sedimentation |
| I | 4 | 6 | 20 | 3 | 2.3 | 1.0 | No sedimentation |

EXAMPLE 4

Each dispersion, comprising a fine cellulose, carrageenan (product of San-Ei Gen F.F.I., Inc.) as a water-insoluble calcium material and starch hydrolyzate (product of Matsutani Chem. Ind. Co., Ltd.) at a solid content ratio of 80/10/10 and having a total solid content concentration of 10%, was prepared from the aqueous suspension compositions A to D obtained in Example 1. It should be noted that the total solid concentration of the aqueous suspension composition A was adjusted to 6%.

Each of the dispersions in the paste form was cast on an aluminum plate, followed by drying in an oven of 80° C., thereby each of water-dispersible dry compositions J to M was obtained. The resulting water-dispersible dry composition was dispersed in water again and the average particle size and proportion of the particles having a particle size of at least 10 μm were measured. The results and the state of the sedimentation after the dispersion was allowed to stand for 1 day are shown in Table 3.

EXAMPLE 5

Dispersions, comprising a fine cellulose, xanthan gum (product of San-Ei Gen F.F.I., Inc.) as a water-insoluble calcium material and dextrose (product of Wako Pure Chemical Industries, Ltd.) at a solid content ratio of 65/5/30 and having a total solid content concentration of 8%, were prepared from the aqueous suspension compositions H and I obtained in Example 3, respectively.

The resulting dispersions in the pasty form were spray dried, thereby water-dispersible dry compositions H and I were obtained. The resulting water-dispersible dry compositions were each re-dispersed in water and the average particle size and proportion of the particles having a particle size of at least 10 μm were measured. The results and the state of sedimentation after the dispersion was allowed to stand for 1 day are shown in Table 3.

EXAMPLE 6

A dispersion comprising a fine cellulose and carboxymethylcellulose.sodium (product of Dai-ichi Kogyo Seiyaku Co., Ltd.) as a water-insoluble calcium material at a solid content ratio of 95/5 and having a total solid content concentration of 10% was prepared.

The resulting dispersion in the pasty form was cast on an aluminum plate, followed by drying in an oven of 80° C., thereby a water-dispersible dry composition P was obtained. The resulting water-dispersible dry composition was re-dispersed in water and the average particle size and proportion of the particles having a particle of at least 10 μm were measured. The results and the state of sedimentation after the dispersion was allowed to stand for 1 day are shown in Table 3.

EXAMPLE 7

A dispersion comprising a fine cellulose and a water-insoluble calcium material, carrageenan (product of San-Ei Gen F.F.I., Inc.) and polydextrose (product of Cultor Food Science Inc.) at a solid content ratio of 40/10/50 and having a total solid content concentration of 10% was prepared.

The dispersion in the pasty form was cast onto an aluminum plate, followed by drying in an oven of 80° C., thereby a water-dispersible dry composition V was obtained. The resulting water-dispersible dry composition was re-dispersed in water and the average particle size and proportion of the particles having a particle size of at least 10 μm were measured. The results and the state of sedimentation after the dispersion was allowed to stand for 1 day are shown in Table 3.

EXAMPLE 8

In the same manner as in Example 1, a cellulose cake having a solid content of 40% was prepared.

The resulting cellulose, calcium carbonate (product of Wako Pure Chemical Industries, Ltd.) used in Example 1, karaya gum (product of Toyo Petrolite Co., Ltd.) and starch hydrolyzate were mixed to give a solid content ratio of 30/40/10/20. The resulting mixture was kneaded for 40 minutes in a planetary mixer (manufactured by Shinagawa Seisakujo K.K.) while its water content was adjusted. The kneaded mass was then subjected to extrusion kneading twice by using an eck pelleter (manufactured by Fuji Paudal Co., Ltd.).

The pellet was dried in an oven of 60° C. for one day, followed by pulverization in a bantam mill (manufactured by Fuji Paudal Co., Ltd.), thereby a water-dispersible dry composition W was obtained. The resulting water-dispersible dry composition was re-dispersed in water and the average particle size and proportion of the particles having a particle size of at least 10 μm were measured. The results and the state of sedimentation after the dispersion was allowed to stand for 1 day are shown in Table 3.

TABLE 3

| | Water dispersible dry composition | Aqueous suspension composition employed | State after dispersion in water | | Sedimentation after allowed to stand for 1 day |
|---|---|---|---|---|---|
| | | | Average Particle size (μm) | Proportion of particles of ≧10 μm | |
| Ex. 4 | J | A | 2.6 | 2.8 | no sedimentation |
| | K | B | 2.3 | 1.9 | no sedimentation |
| | L | C | 2.0 | 2.2 | no sedimentation |
| | M | D | 1.5 | 0.4 | no sedimentation |
| Ex. 5 | N | H | 5.1 | 19 | no sedimentation |
| | O | I | 2.3 | 2.5 | no sedimentation |
| Ex. 6 | P | C | 2.5 | 1.9 | no sedimention |
| Ex. 7 | C | C | 2.2 | 1.6 | no sedimentation |
| Ex. 8 | W | — | 6.5 | 33 | no sedimentation |

EXAMPLE 9

With 100 parts of commercially available milk, 5 parts (0.75 part in terms of a solid content) of the aqueous suspension composition B or 0.5 part of the water-dispersible dry composition K was mixed, followed by homogenization in a high-pressure homogenizer under a pressure of 150 kg/cm$^2$, thereby calcium-reinforced milk was prepared.

The state of the sedimentation after the milk was allowed to stand at 5° C. for 1 day and evaluation of the texture are shown in Table 6.

EXAMPLE 10

In the same manner as in Example 9 except for the use of 0.5 part of the water-dispersible dry composition K instead of the aqueous suspension composition B, calcium-reinforced milk was prepared.

The state of the sedimentation after the milk was allowed to stand at 5° C. for 1 day and evaluation of the texture are shown in Table 6.

EXAMPLE 11

After 0.5 part of cocoa powder, 5 part of sugar, 0.8 part of whole milk powder, 0.05 part of salt, 0.2 part of stearic monoglyceride and 0.5 part of the water-dispersible dry composition J were mixed as were in the powdery form, the resulting mixture was added to 93 parts of warm water of 70° C. The mixture was preliminary dispersed by a propeller mixer.

The dispersion was allowed to pass through a high-pressure homogenizer under pressures of 150 kg/cm$^2$ and 200 kg/cm$^2$, respectively for homogenization. The homogenized dispersion was filled in a heat-resistant bottle and sterilized at 121° C. for 30 minutes, thereby a calcium-containing cocoa drink was prepared. After cooling, the bottle was slightly shaken and then the drink was charged in a sedimentation tube of 100 ml.

The state of sedimentation of calcium and cocoa and evaluation of the feeling of the drink on the tongue after the drink was allowed to stand at 5° C. for one day are shown in Table 6.

EXAMPLE 12

A calcium- and food-fiber-reinforced biscuit having excellent shape retention was made.

After 30 parts of the water-dispersible dry composition W, 300 parts of wheat flour, 100 parts of sugar, 6 parts of sodium bicarbonate and 3 parts of salt were mixed in the powdery form and charged in a planetary mixer, 150 parts of margarine, 30 parts of the whole egg and 50 parts of water were added. The resulting mixture was kneaded for 5 minutes. The adhesion of the resulting dough to the wall of the kneader at the time of kneading was observed to be good. The kneaded dough was allowed to stand overnight in a refrigerator and then brought back to room temperature. It was formed into uniform pieces of 15 mm in thickness, 30 mm in width and 15 mm in length. They were baked in an oven of 160° C. for 20 minutes, thereby biscuits were obtained. The biscuits had good shape retention without sagging.

EXAMPLE 13

A low-fat mayonnaise-like dressing which had calcium and food fibers reinforced and had excellent emulsion stability was prepared.

In a hobert mixer, 80 parts of the water-dispersible dry composition K was dispersed in 377 parts of water. Under stirring, 3 parts of xanthan gum and 100 parts of egg yolk were added to the resulting mixture, followed by the addition of 330 parts of salad oil under stirring. While stirring was continued, 70 parts of vinegar, 26 parts of salt, 9 parts of sugar, 4 parts of mustard powder and 1 part of sodium glutamate were added. Stirring was carried out for about 30 minutes in total. Then, the resulting mixture was allowed to pass through a colloid mill and emulsified, thereby the above-described dressing was prepared.

The dressing had a smooth texture and no coarse texture was felt on the tongue. The dressing was charged in a glass bottle and dipped for 15 minutes in hot water of 95° C., but neither water separation nor oil separation was found, indicating stable emulsification.

COMPARATIVE EXAMPLE 1

In a similar manner to Example 1, a composition Q as shown in Table 4 as obtained.

COMPARATIVE EXAMPLE 2

In a similar manner to Example 1, a cellulose cake having a solid content of 45% was prepared.

A dispersion was prepared from the resulting cellulose and calcium carbonate product of Wako Pure Chemical Industries, Ltd.) at a solid content weight ratio and concentration as shown in Table 4. The resulting dispersion was treated at 10000 rpm for 10 minutes by using a TK homomixer (manufactured by Tokushu Kika Kogyo Co., Ltd.), thereby a composition R was obtained.

Concerning the composition R, the average particle size and the proportion of the fraction having a particle size of at least 10 μm are shown in Table 4. Table 4 also includes the observation results of the state of the sedimentation after the composition R was diluted to 1% concentration and allowed to stand for 1 day.

TABLE 4

| | Composition | | | | Physical properties of the composition | | |
| | | Solid content weight ratio | | | | | |
| | Composition | Fine cellulose | Calcium material | Concentration (%) | Average particle size (μm) | Proportion of particles of ≧ 10 μm(%) | State of precipitation after allowed to stand for 1 day |
|---|---|---|---|---|---|---|---|
| Comp. Ex. 1 | Q | 0.5 | 9.5 | 30 | 1.2 | 0 | Sedimentation occurred |
| Comp. Ex. 2 | R | 4 | 6 | 15 | 8.8 | 42 | Sedimentation occurred |

COMPARATIVE EXAMPLE 3

In a similar manner to Example 4, the compositions Q and R obtained in Comparative Examples 1 and 2 were treated, thereby compositions S and T as shown in Table 5 were obtained, respectively.

COMPARATIVE EXAMPLE 4

The aqueous suspension composition B obtained in Example 1 was cast onto an aluminum plate and dried in an oven of 80° C., thereby a composition U was obtained. The resulting composition U was re-dispersed in water and its average particle size and proportion of the particles having a particle size of at least 10 μm were measured.

The results and the state of the sedimentation of the dispersion after allowed to stand for one day are shown in Table 5.

TABLE 5

| | | | State after dispersion in water | | State of precipitation |
| | Composition | Composition employed | Average particle size (μm) | Proportion of particles of ≧10 μm (%) | after allowed to stand for 1 day |
|---|---|---|---|---|---|
| Comp. Ex. 3 | S | Q | 1.7 | 0.2 | Sedimentation occurred |
| | T | R | 9.5 | 43 | |
| Comp. Ex. 4 | U | B | 18 | 65 | Sedimentation occurred |

COMPARATIVE EXAMPLE 5

In a similar manner to Example 9, the composition R obtained in Comparative Example 2 was treated, thereby calcium-reinforced milk was obtained.

The state of sedimentation and evaluation on the feeling of the milk on the tongue after the milk was allowed to stand at 5° C. for 1 day are shown in Table 6.

COMPARATIVE EXAMPLE 6

In a similar manner to Example 9, the composition S obtained in Comparative Example 3 was treated, thereby calcium-reinforced milk was obtained.

The state of sedimentation and evaluation on the feeling of the milk on the tongue after the milk was allowed to stand at 5° C. for 1 day are shown in Table 6.

COMPARATIVE EXAMPLE 7

In accordance with JP-B-63-29973, calcium-reinforced milk was prepared. Described specifically, 5 parts of a commercially available crystalline cellulose preparation ("Avicel RC-N81", trade name), 2.5 parts of calcium carbonate used in Example 1 and 2.5 parts of calcium phosphate used in Example 3 were mixed with 1000 parts of commercially available milk, followed by homogenization in a high-pressure homogenizer under a pressure of 150 kg/cm$^2$, thereby calcium-reinforced milk was obtained.

The state of sedimentation of the milk and evaluation on the texture after allowed to stand at 5° C. for 1 day are shown in Table 6.

It should be noted that "Avicel RC-N81", calcium carbonate and calcium phosphate were mixed at a ratio of 2/1/1 and as a result of measuring the particle size in accordance with the process of the present invention, the mixture had an average particle size of 8.8 μm and the proportion of the particles having a particle size of at least 10 μm was 45%. In addition, the average particle size of calcium carbonate used in this example was measured by the sedimentation method ("CP-50", trade name; a sedimentation type particle size distribution measuring apparatus manufactured by Shimadzu Corporation) in order to indicate it in a stokes particle size as described in JP-B-63-29973, resulting in 2.4 μm. That of calcium phosphate was 2.8 μm.

TABLE 6

| | Ex. 9 | Ex. 10 | Ex. 11 | Comp. Ex.5 | Comp. Ex.6 | Comp. Ex.7 |
|---|---|---|---|---|---|---|
| Evaluation of feeling on tongue | | | | | | |
| those who answered "coarse feel" remained on the tongue | 1 | 0 | 1 | 12 | 8* | 9 |
| those who answered no "coarse feel" remained on the tongue | 13 | 14 | 12 | 0 | 4 | 3 |
| those who answered "impossible to judge" | 1 | 1 | 2 | 3 | 3 | 3 |

TABLE 6-continued

|  | Ex. 9 | Ex. 10 | Ex. 11 | Comp. Ex.5 | Comp. Ex.6 | Comp. Ex.7 |
|---|---|---|---|---|---|---|
| State of sedimentation (presence or absence of sedimentation) | Absent | Absent | Absent | Present | Present | Slightly present |

*This also includes many responses that a powdery texture was felt.

INDUSTRIAL APPLICABILITY

The aqueous suspension composition or water-dispersible dry composition according to the present invention which contains a water-insoluble calcium material exhibits stable dispersion, because the sedimentation of the water-insoluble calcium material in water is markedly suppressed due to compounding with a fine cellulose and the grinding treatment. In addition, a coarse texture felt on the tongue is reduced.

Accordingly, in a food composition, particularly a beverage, containing the above-described aqueous suspension composition or water-dispersible dry composition, the sedimentation of the water-insoluble calcium material is markedly suppressed, which improves the texture.

The aqueous suspension composition or water-dispersible dry composition according to the present invention does not easily cause sedimentation so that when a water-insoluble calcium material is incorporated as a filler or the like, workability can be improved.

What is claimed is:

1. An aqueous suspension composition containing at least 20 wt. % of fine cellulose particles and water-insoluble calcium material particles which have been subjected to a wet co-grinding treatment, having a weight ratio of the fine cellulose particles to the water-insoluble calcium material particles of from 1/9 to 9/1, and wherein not greater than 40% of the particles have a particle size of at least 10 μm.

2. The aqueous suspension composition according to claim 1, wherein the fine cellulose and the water-insoluble calcium material have an average particle size not greater than 8 μm.

3. A food composition containing the aqueous suspension composition as claimed in claim 1 or 2.

4. The aqueous suspension composition according to claim 1, wherein the water-insoluble calcium material is selected from the group consisting of calcium carbonate, tricalcium phosphate, calcium monohydrogenphosphate, calcium dihydrogenphosphate, calcium sulfate, calcium citrate and calcium lactate.

5. The aqueous suspension composition according to claim 1, wherein not greater than 30% of the particles have a particle size of at least 10 μm.

6. A process for the preparation of an aqueous suspension composition, which comprises: suspending low-polymerization-degree cellulose particles and water-insoluble calcium particles in water to provide a suspension having a weight ratio of the low-polymerization-degree cellulose particles to the water-insoluble calcium particles of from 1/9 to 9/1 and a content of the low-polymerization-degree cellulose particles and water-insoluble calcium particles of at least 2 wt. %; and then subjecting the suspension to a wet co-grinding treatment to adjust the average particle size of the fine cellulose particles and water-insoluble calcium material particles to not greater than 8 μm and to adjust the proportion of particles having a particle size of at least 10 μm to not greater than 40%.

7. The process for the preparation of an aqueous suspension composition according to claim 6, wherein the water-insoluble calcium material is selected from the group consisting of calcium carbonate, tricalcium phosphate, calcium monohydrogenphosphate, calcium dihydrogenphosphate, calcium sulfate, calcium citrate and calcium lactate.

8. The process for the preparation of an aqueous suspension composition according to claim 6, wherein the proportion of particles having a particle size of at least 10 μm is adjusted to not greater than 30%.

9. A water-dispersible dry composition, which comprises: 30 to 98 wt. % of fine cellulose particles and water-insoluble calcium material particles which have been subjected to a wet co-grinding treatment; and from 2 to 70 wt. % of a water soluble gum and/or a hydrophilic substance, wherein the weight ratio of the fine cellulose particles to the water-insoluble calcium material particles is from 1/9 to 9/1, and wherein when the dry composition is re-dispersed in water by stirring, the proportion of the fine cellulose particles and water-insoluble calcium material particles having a particle size of at least 10 μm is not greater than 40%.

10. A food composition containing the water-dispersible dry composition as claimed in claim 9 or 14.

11. The water-dispersible dry composition according to claim 9, wherein the water-insoluble calcium material is selected from the group consisting of calcium carbonate, tricalcium phosphate, calcium monohydrogenphosphate, calcium dihydrogenphosphate, calcium sulfate, calcium citrate and calcium lactate.

12. The process for the preparation of an aqueous suspension composition according to claim 6, wherein said average particle size of the fine cellulose particles and water-insoluble calcium material particles is adjusted to not greater than 6 μm.

13. The water-dispersible dry composition according to claim 9, wherein the proportion of the fine cellulose particles and water-insoluble calcium material particles having a particle size of at least 10 μm is not greater than 30%.

14. The water-dispersible dry composition according to claim 9, wherein the fine cellulose and the water-insoluble calcium material have an average particle size not greater than 8 μm when the dry composition is re-dispersed in water by stirring.

* * * * *

UNITED STATES PATENT AND TRADEMARK OFFICE
CERTIFICATE OF CORRECTION

PATENT NO. : 6,117,474
DATED : September 12, 2000
INVENTOR(S) : Etsuo Kamada et al.

It is certified that error appears in the above-identified patent and that said Letters Patent is hereby corrected as shown below:

Column 2,
Line 15, change "20 wt. %" to -- 2 wt. % --

Column 17,
Line 33, change "20 wt. %" to -- 2 wt. % --

Signed and Sealed this

Ninth Day of April, 2002

Attest:

JAMES E. ROGAN
Attesting Officer     Director of the United States Patent and Trademark Office